(12) United States Patent
Hanzawa

(10) Patent No.: US 6,304,374 B1
(45) Date of Patent: *Oct. 16, 2001

(54) STEREOMICROSCOPE

(75) Inventor: Toyoharu Hanzawa, Tokyo-to (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/133,382

(22) Filed: Aug. 13, 1998

Related U.S. Application Data

(62) Division of application No. 08/922,357, filed on Sep. 3, 1997, now Pat. No. 5,822,114, which is a continuation of application No. 08/141,095, filed on Oct. 26, 1993, now abandoned.

(30) Foreign Application Priority Data

Oct. 27, 1992 (JP) .................................... 4-288976
May 31, 1993 (JP) .................................... 5-149755

(51) Int. Cl.[7] ............................. G02B 21/22; G02B 21/00
(52) U.S. Cl. ......................... 359/380; 359/368; 359/376
(58) Field of Search ............................ 359/368, 372–380

(56) References Cited

U.S. PATENT DOCUMENTS

| | | | |
|---|---|---|---|
| 3,030,857 | 4/1962 | Shumway | 359/375 |
| 4,634,241 | 1/1987 | Kohayakawa et al. | 359/377 |
| 4,647,845 | 3/1987 | Richter et al. | 324/57 |
| 4,710,000 | 12/1987 | Spitznas et al. | 359/377 |
| 4,798,451 | 1/1989 | Fujiwara | 359/376 |
| 5,227,914 | 7/1993 | Hanzawa et al. | 359/377 |
| 5,543,962 | 8/1996 | Kitajima et al. | 359/384 |

FOREIGN PATENT DOCUMENTS

| | | |
|---|---|---|
| 3718843 | 12/1987 | (DE) . |
| 214223 | 10/1989 | (DE) . |
| 412379 | 2/1992 | (DE) . |
| 61-190310 | 8/1986 | (JP) . |
| 62-166311 | 7/1987 | (JP) . |
| 4-156412 | 5/1992 | (JP) . |
| 5-107447 | 4/1993 | (JP) . |

*Primary Examiner*—Thong Nguyen
(74) *Attorney, Agent, or Firm*—Pillsbury Winthrop LLP

(57) ABSTRACT

A stereoscopic microscope comprising an objective lens system and a variable magnification optical system which are disposed coaxially with each other in addition to an eyepiece optical system, and configured so as to permit stereoscopic observation of an image of an object by leading, to right and left eyes of an observer by way of the eyepiece optical system, rays having passed through portions apart from optical axes of the objective lens system and the variable magnification optical system. This stereoscopic microscope has a length as measured from the observer's eyes to the object to be observed which is shortened by disposing at least two reflecting members in the variable magnification optical system for bending an optical path in the variable magnification optical system.

12 Claims, 12 Drawing Sheets

IMAGE I

OBJECT O

LATERAL
ABERRATION

ASTIGMATISM
(HORIZONTAL
DIRECTION)

ASTIGMATISM
(VERTICAL
DIRECTION)

LATERAL
ABERRATION

ASTIGMATISM
(HORIZONTAL
DIRECTION)

ASTIGMATISM
(VERTICAL
DIRECTION)

LATERAL
ABERRATION

ASTIGMATISM
(HORIZONTAL
DIRECTION)

ASTIGMATISM
(VERTICAL
DIRECTION)

LATERAL
ABERRATION

ASTIGMATISM
(HORIZONTAL
DIRECTION)

ASTIGMATISM
(VERTICAL
DIRECTION)

LATERAL
ABERRATION

ASTIGMATISM
(HORIZONTAL
DIRECTION)

ASTIGMATISM
(VERTICAL
DIRECTION)

LATERAL
ABERRATION

ASTIGMATISM
(HORIZONTAL
DIRECTION)

ASTIGMATISM
(VERTICAL
DIRECTION)

LATERAL ABERRATION

ASTIGMATISM (HORIZONTAL DIRECTION)

ASTIGMATISM (VERTICAL DIRECTION)

LATERAL ABERRATION

ASTIGMATISM (HORIZONTAL DIRECTION)

ASTIGMATISM (VERTICAL DIRECTION)

LATERAL
ABERRATION

ASTIGMATISM
(HORIZONTAL
DIRECTION)

ASTIGMATISM
(VERTICAL
DIRECTION)

STEREOMICROSCOPE

RELATED APPLICATIONS

This application is a division of application Ser. No. 08/922,357 filed Sep. 3, 1997, now U.S. Pat. No. 5,822,114, which is a continuation of application Ser. No. 08/141,095 filed Oct. 26, 1993, now abandoned, both of which claimed priority benefit of, as does this application, Japanese applications Nos. 288976/92, filed Oct. 27, 1992 and 149,755/93 filed May 31, 1993, the contents of those prior U.S. and Japanese applications being incorporated hereinto by reference.

BACKGROUND OF THE INVENTION a) Field of the Invention

The present invention relates to a stereomicroscope.

b) Description of the Prior Art

Stereoscopic microscopes which permit observing conditions of minute locations on objects in three dimensions are widely used for research, inspections, surgical operations and so on. In recent years where sophisticated techniques are prevailing in a variety of fields, it is strongly desired to obtain a stereoscopic microscope which permits observation for a long time by two persons in relaxed postures while performing works on an object from any desired directions.

As a conventional example of stereoscopic microscopes, there is known a stereoscopic microscope which was disclosed by Japanese Patent Kokai Publication No. Hei 4-156, 412. This stereoscopic microscope has a composition which consists, as illustrated in FIG. 1, of an objective lens system 2, an afocal optical system 3 disposed coaxially with the objective lens system 2 and at least a pair of eyepiece optical systems 15. The stereoscopic microscope is configured so as to satisfy the desire described above by configuring the eyepiece optical systems 15 as a whole so as to be rotatable around an axis which is located in parallel with optical axes of the objective lens system 2. In FIG. 1, the reference numeral 16 represents eyes of observers and the reference numeral 17 designates optical path splitting elements disposed in the eyepiece optical systems 15.

In the case of the stereoscopic microscope illustrated in FIG. 1, however, the afocal variable magnification optical system must have a diameter of an exit pupil thereof which is large enough to cover right and left pupils for observation of the eyepiece optical systems 15. However, a stereoscopic microscope generally uses two afocal variable magnification systems. In order to enlarge a diameter of one of the two afocal variable magnification optical systems so that light bundles are incident on the two right and left eyepiece optical systems, the diameter of the exit pupil of the variable magnification optical system must be made at least double in size, whereby the afocal variable magnification optical system inevitably has a length at least two times larger than a length of each of the two afocal variable magnification optical systems. As a result, the stereoscopic microscope has a prolonged total length or a length as measured from an object to be observed to an eyepiece lens component, thereby making it rather inconvenient to perform works on and in the vicinity of a surface of the object while peeping through the eyepiece lens system.

Further, when a total length of the variable magnification optical systems is shortened without changing the enlarged diameter of the exit pupil, focal lengths of respective lens components are shortened, thereby making it difficult to manufacture the lens components with high precision in practice and adjust locations of the lens components accurately at a stage of assembly of the afocal variable magnification optical systems.

For the reason described above, it has conventionally been difficult to obtain a stereoscopic microscope comprising an objective lens system and a variable magnification optical system which are disposed on a common optical axis, and permitting performing works on a surface of an object while observing an image thereof as described above.

SUMMARY OF THE INVENTION

A primary object of the present invention is to provide a stereoscopic microscope which uses a single vary-focal optical system, and which is configured so as to have a short length from a surface of an object to an eye point, and which features a merit to perform work on the object.

Another object of the present invention is to provide a stereoscopic microscope which is of the type described above and uses a compact variable magnification optical system having favorable optical performance.

The stereoscopic microscope according to the present invention comprises an objective lens system and a vary-focal optical system which are disposed consecutively on a common optical axis, has a plurality of pupils in a light bundle emerging from the variable magnification optical system, and is configured so as to have a length as measured from an object to be observed to an eye point which is shortened by deflecting the light bundle by using two or more reflecting members in the variable magnification optical system.

Speaking more concretely, the stereoscopic microscope according to the present invention comprises the objective lens system, the vari-focal optical system which is disposed coaxially with the objective lens system and eyepiece optical systems; permits observing a three-dimensional image of an object while leading rays which are apart from the optical axis, out of rays coming from the object and passing through the objective lens system and the variable magnification optical system, to right and left eyes of an observer through the eyepiece optical systems; and is configured so as to shorten a length as measured from the object to the eyes of the observer by deflecting an optical path in the variable magnification optical system by using at least two reflecting members in the variable magnification optical system.

In the stereoscopic microscope according to the present invention, the vari-focal optical system is composed of a first lens unit having a positive refractive power, a second lens unit having a negative refractive power, and a third lens unit having a positive refractive power; and the first lens unit and the second lens unit are moved along the optical axis for changing a magnification of the stereoscopic microscope.

For configuring the optical system comprised in the stereoscopic microscope according to the present invention so as to be compact, it is necessary to strengthen the refractive powers of the lens units which are to be used for composing the variable magnification optical system. When the refractive powers of the lens units are strengthened in the variable magnification optical system which is composed of the first lens unit having the positive refractive power, the second lens unit having the negative refractive power and the third lens unit having the positive refractive power, the second lens unit in particular has a strong negative refractive power and a location of an image formed by the stereoscopic microscope is deviated due to indication and/or eccentricity of the second lens unit. Such an adverse influence is produced remarkably in particular due to inclinations and eccentricities of movable lens units. For this reason, the magnification of the stereoscopic microscope according to the present invention is changed by moving the first lens unit and the second lens unit, with the second lens unit having the strong refractive power kept stationary so as to prevent an adverse influence from being produced by moving the second lens unit. Further, it is necessary to use a lens barrel and moving mechanisms which are manufactured with high precisions for minimizing the inclinations and eccentricities of the movable lens units. The stereoscopic microscope according to the present invention, in which the second lens unit having the strong refractive power is kept stationary, permits simplifying structures of the lens barrel and moving mechanisms.

Furthermore, the stereoscopic microscope according to the present invention permits shortening the length as measured from the object to be observed to the eye point by using two reflecting members at locations which are fixed relatively to the second lens unit in the variable magnification optical system.

DETAILED DESCRIPTION OF THE PREFERRED EMBODIMENTS

Now, the present invention will be described in more detail below with reference to the preferred embodiments thereof illustrated in the accompanying drawings.

Figure 2:
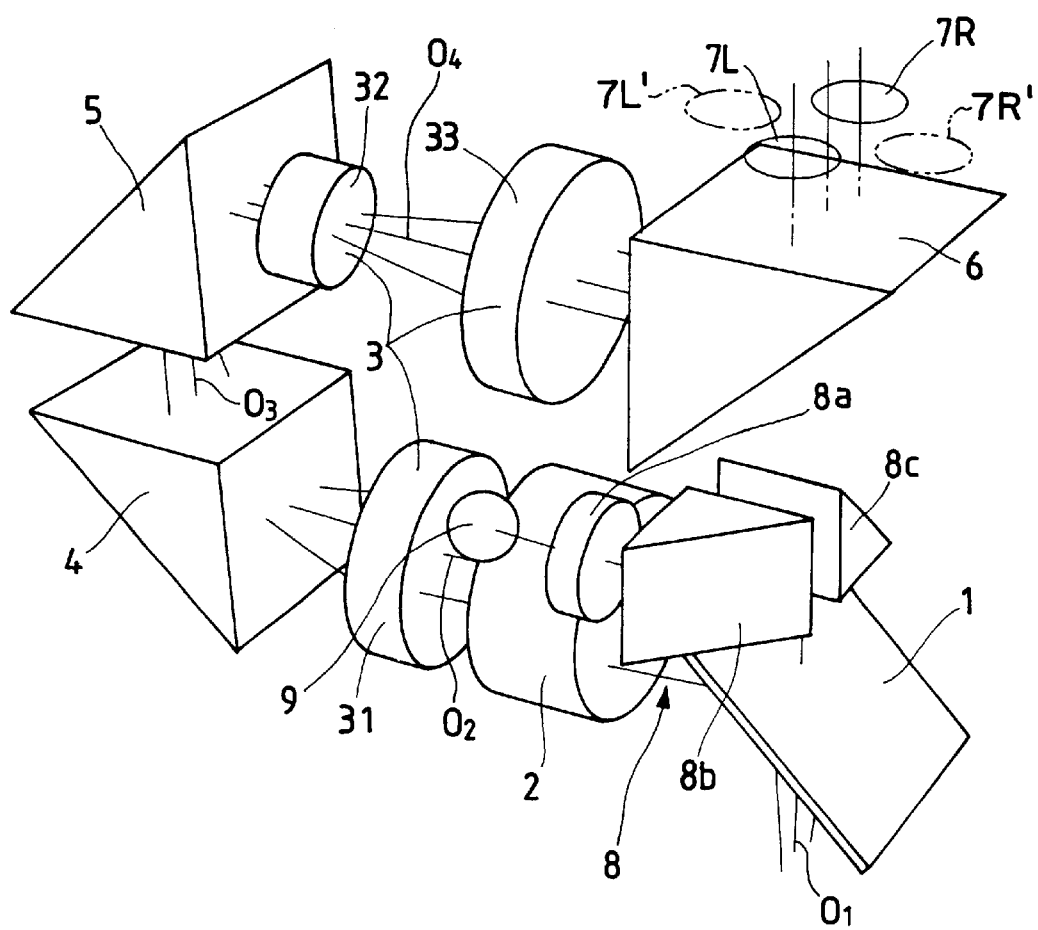
FIG.2 shows a perspective view illustrating a composition a first embodiment of the stereoscopic microscope according to the present invention.

FIG. 2 shows a perspective view illustrating the composition of the first embodiment of the stereoscopic microscope according to the present invention. In this drawing, the reference numeral 1 represents a first reflecting member which functions to deflect sideways or rearward a light bundle which comes from an object (not shown). The reference numeral 2 designates an objective lens system which functions to transform the light bundle reflected by the first reflecting member 1 into an afocal light bundle, the reference numeral 3 denotes an afocal variable magnification optical system disposed after the objective lens system, the reference numerals 4 and 5 represent a second reflecting member and a third reflecting member respectively which are disposed in the afocal variable magnification optical system, and the reference numeral 6 designates a fourth reflecting member which functions to deflect a light bundle emerging from the afocal optical system; eyepiece optical systems being disposed in the optical path reflected by the fourth reflecting member.

In the stereoscopic microscope preferred as the first embodiment of the present invention, the light bundle (having an optical axis $O_1$) coming from the object is reflected by the first reflecting member 1 so as to follow an optical path deflected along another optical axis $O_2$ is incident on the objective lens system 2 and transformed into an afocal light bundle, and falls on the afocal variable magnification optical system 3. After falling on the afocal variable magnification optical system, the afocal light bundle is deflected by the second reflecting member 4 so as to follow an upward optical path $O_3$, further deflected by the third reflecting member 5 and follows a still another optical path $O_4$ which is in parallel with the optical path $O_2$ and set in a direction reverse to that of the optical axis $O_2$, and then emerges from the afocal vari-focal optical system 3. After emerging from the afocal optical system 3, the afocal light bundle is deflected by the fourth reflecting member 6 so as to follow an optical path which is located on an extension line of the optical axis $O_1$.

For the light bundle which is reflected by the fourth reflecting member 6 as described above, two right and left pupils 7R and 7L are set for three-dimensional observation through the eyepiece optical systems. Speaking more concretely, rays passing through locations apart from the optical axes $O_1$, $O_2$ and $O_3$, out of the rays which are emitted from the object to be observed, transmit through the objective lens system 2 and the variable magnification optical system 3 and are reflected by the fourth reflecting member 6, travel through the eyepiece optical systems and are led to the eyes of the observer.

Figure 1:
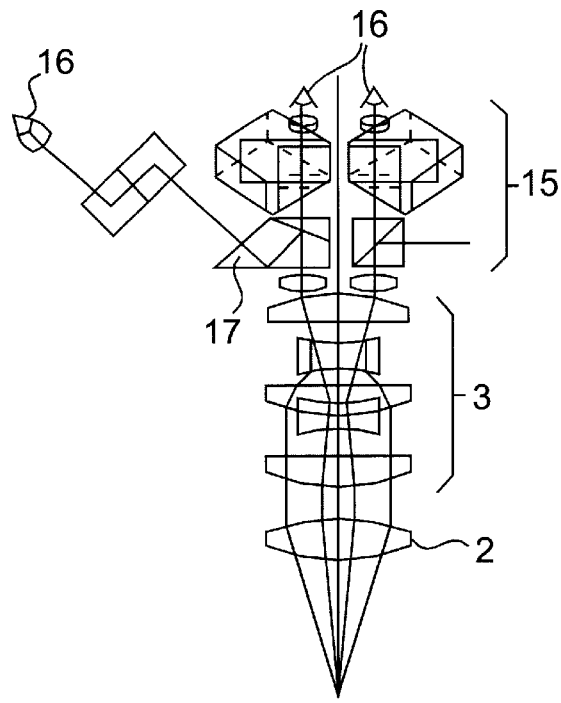
FIG. 1 shows a sectional view illustrating the composition of the conventional stereoscopic microscope.
Figure 3:
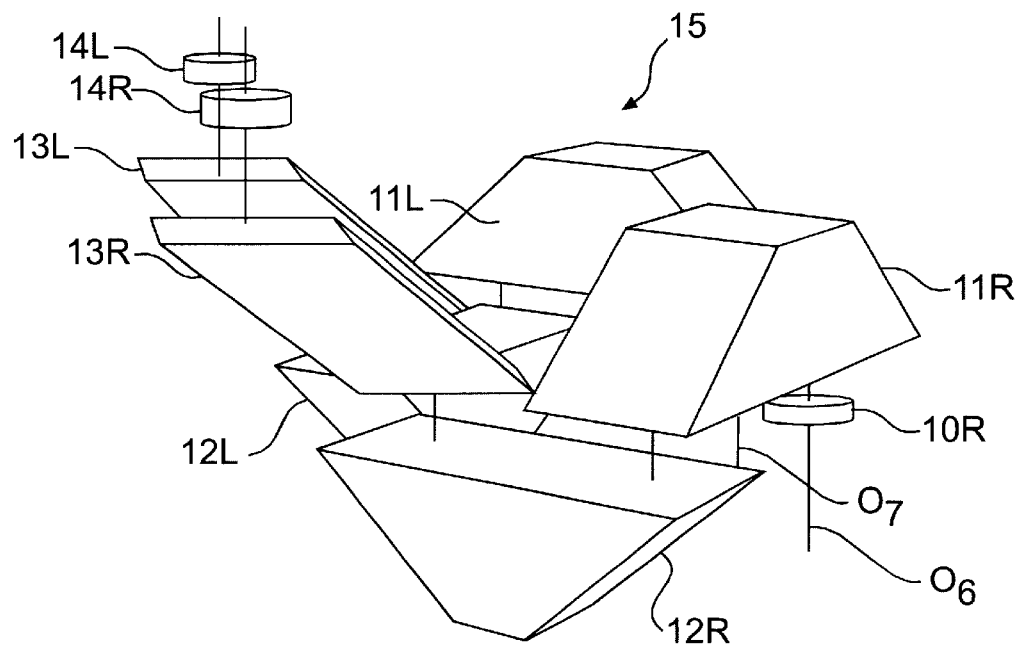
FIG. 3 shows a perspective view illustrating a composition eyepiece optical systems to be used in the first embodiment of the present invention.

Since the first embodiment of the present invention described above forms an inverted image, it must use means for obtaining an erect image from the inverted image (means such as erecting prisms or optical members for reimaging the image an even number of times). For this reason, it is conceived to use, as the eyepiece optical systems to be disposed on the reflection side of the fourth reflecting member 6, optical systems each of which comprises an imaging lens component, means for erecting the inverted image and an eyepiece lens component for magnifying the image. FIG. 3 shows a concrete example of an eyepiece optical system 15 to be used in the first embodiment of the present invention. In this drawing, the reference numeral 10R represents a right side imaging lens component (a left side imaging lens component is not shown), the reference numerals 11L, 12L and 11R, 12R designate left and right side erecting prism (a left side erecting prism is not shown) the reference numerals 13L and 13R denote prisms for adjusting a width between the eyes, and the reference numerals 14L and 14R represent left and right side eyepiece lens systems respectively for magnifying the image. The eyepiece optical system 15 having the composition described above are configured so as to be rotatable as a whole, while keeping optical axis $O_5$ of the variable magnification optical system 3 in parallel with the right and left side optical axes $O_6$, $O_1$ of the eyepiece optical systems 15, within a range where the right and left pupils 7R and 7L of the eyepiece optical systems are located within a region of the light bundle emerging from the variable magnification optical system 3 shown in FIG. 2.

Further, it is possible to configure the first embodiment of the stereoscopic microscope according to the present invention so as to permit observation of the image simultaneously by a plurality of observers when light bundle splitting members are disposed between the variable magnification optical systems 3 and the eyepiece optical systems 15, and the eyepiece optical systems 15 are disposed in the split optical paths respectively. In this case, observation is possible with no loss of light intensity by splitting the light bundle at locations of the pupils.

Furthermore, it is possible to perform the observation in a coaxial illumination mode without changing a distance as measured from the observation system to the eye point when a partially transmitting-reflecting member such as a half mirror is adopted as the first reflecting member 1, and an illumination system 8 which consists of a condenser lens component 8a and two prisms 8b, 8c is disposed, together with a light source 9, on the side of the rays having passed through the partially transmitting-reflecting member (to be hereinafter referred to as a transmission side), out of rays emitted from the object to be observed, as illustrated in FIG. 2.

Figure 4:
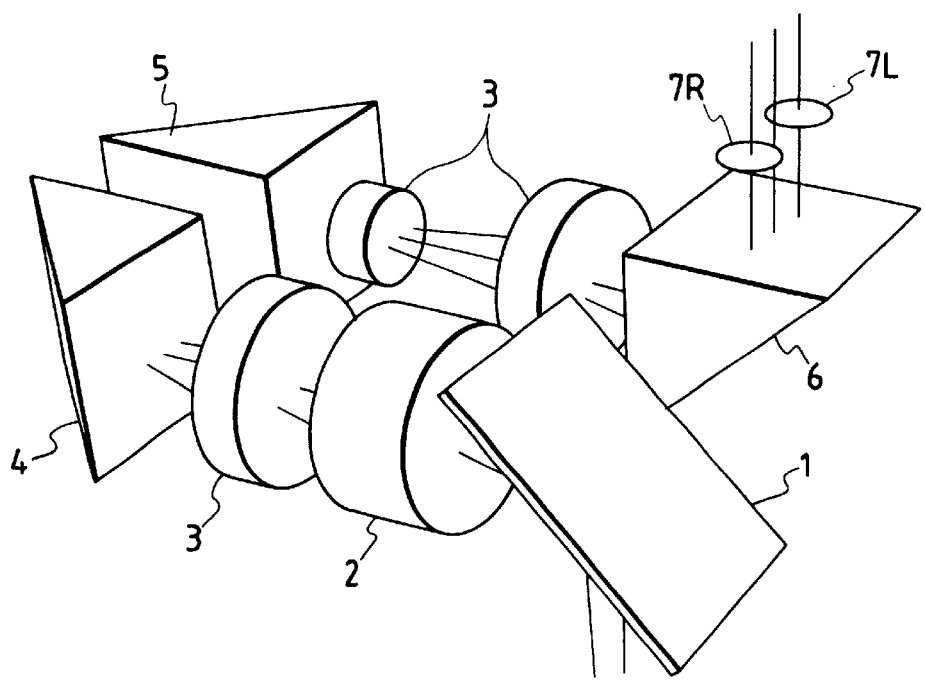
FIG. 4 shows a perspective view illustrating a composite on a second embodiment of the stereoscopic microscope according to the present invention.

FIG. 4 illustrates the second embodiment of the stereoscopic microscope according to the present invention. The second embodiment uses a second reflecting member 4, a third reflecting member 5 and a fourth reflecting member 6 which are disposed so that a light bundle incident on a variable magnification optical system 3 is deflected in a horizontal direction by the second reflecting member 4, deflected by the third reflecting member 5 so as to travel in a reverse direction in parallel with an optical axis $O_2$ and is further deflected upward by the fourth reflecting member 6. For the light bundle which is reflected by the fourth reflecting member 6, two pupils 7L and 7R are set for three-dimensional observation through eyepiece optical systems arranged over the fourth reflecting member 6.

In the second embodiment described above, a first reflecting member 1, the second reflecting member 4, the third reflecting member 5 and the fourth reflecting member 6 compose a system which functions like a porro prism of type II. Since the reflecting members function to erect an inverted image, it is unnecessary to dispose means for erecting an image in the second embodiment.

Figure 5:
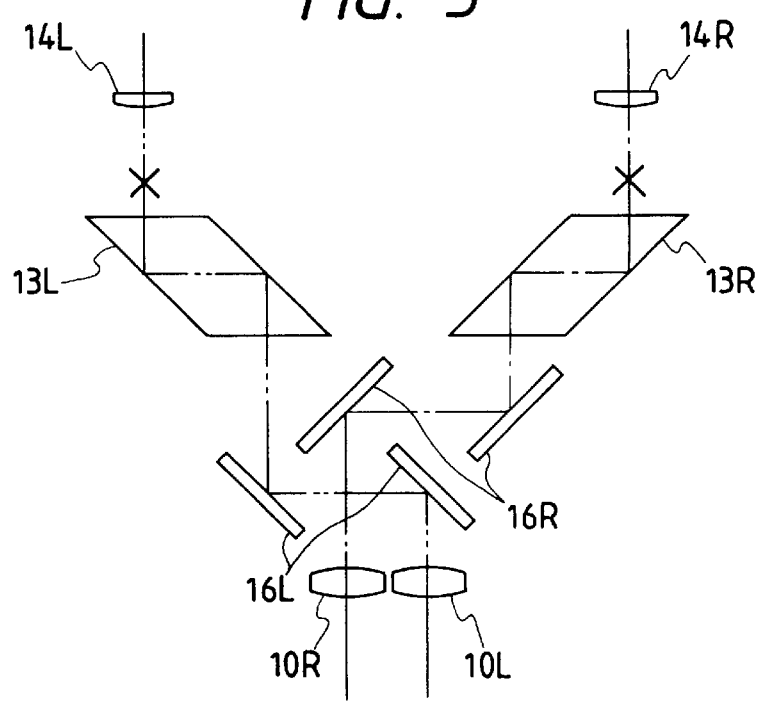
FIG. 5 shows a sectional view illustrating a composition of eyepiece optical systems to be used in the second embodiment of the present invention.

However, the system composed of the reflecting members functions to replace locations of the right and left pupils with each other, it is necessary in the second embodiment to use eyepiece optical systems which have a composition exemplified in FIG. 5. Speaking concretely, the second embodiment uses optical members (or reflecting members) 16L and 16R which function to replace the locations of the two pupils with each other in a section between the imaging lens components 10L, 10R and the prisms 13L, 13R for adjusting a width between the eyes of the observer.

Since the eyepiece optical systems shown in FIG. 5 comprise no means for erecting an inverted image, these systems permit reserving a width between them which is narrower than that to be reserved between the eyepiece optical systems which use the means for erecting the inverted image (the reflecting members 11L, 11R, 12L and 12R) as shown in FIG. 3. Further, the means for erecting the inverted image are expensive since each of the means must be manufactured with high precision and uses two roof prisms. Accordingly, the eyepiece optical systems which do not use the means for erecting the inverted image as shown in FIG. 5 are less expensive.

The second embodiment in which a light bundle is deflected in the horizontal direction by the first reflecting member 1 through the fourth reflecting member 6 can have a total vertical length equal to a total sum of a maximum diameter of lens components and thickness of a barrel for sustaining the lens components (a vertical length of the barrel itself) and makes it possible to bring an eye point nearer an object to be observed. Though an optical axis up to the first reflecting member 1 is deviated from the optical axis of the light bundle which is reflected by the fourth reflecting member 6, this deviation poses nearly no problem since it is on the order of the total sum of the maximum diameter of the lens components and the thickness of the barrel. Considering the fact that the stereoscopic microscope is to be used for performing elaborate works for a long time while observing images of objects through the microscope, however, it is desirable that the optical axis ° 1 up to the first reflecting member 1 is coincident with the optical axis of the light bundle which is reflected by the fourth reflecting member 6 by using reflecting members. When the optical axes are coincident with each other, the eye point is located a little farther from the object to be observed.

Figure 6:
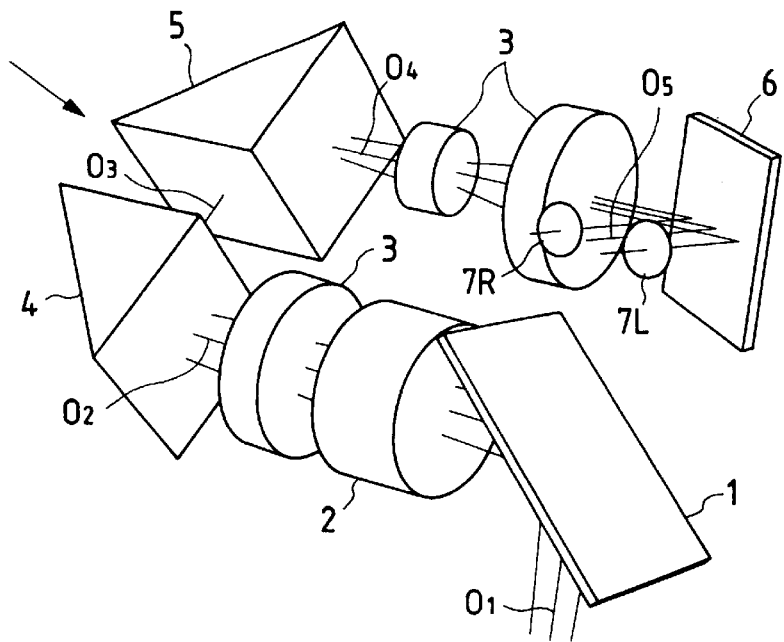
FIG. 6 shows a perspective view illustrating a composition a third embodiment of the stereoscopic microscope according to the present invention.

FIG. 6 shows a perspective view illustrating the third embodiment of the stereoscopic microscope according to the present invention. The third embodiment is equivalent to the second embodiment when the latter is configured so that the second reflecting member 4, the third reflecting member 5 and the fourth reflecting member 6 (or an optical axis $O_3$ and an optical axis $O_4$) are rotatable as a whole around a central axis $O_2$ located between the first reflecting member 1 and the second reflecting member 4 (or an optical axis of a light bundle incident from the objective lens system 2 as a nearly parallel light bundle onto the vari-focal optical system 3, which will hereinafter be referred to as an axis of rotation A), and at the same time, the fourth reflecting member 6 is rotatable around the optical axis $O_4$ (to be hereinafter referred to as an axis of rotation B). When an angle of rotation around the axis of rotation A is represented by "a" and another angle of rotation of the reflecting member 6 around the axis of rotation B is designated by "b", the reflecting members are rotated so as to satisfy relationship of a : b=1:2. That is to say, the third embodiment permits changing a direction of a light bundle reflected by the fourth reflecting member 6 while keeping an image in an erect position thereof or preventing the image from being inclined, thereby allowing the observer to change directions for observation through the eyepiece optical systems.

Figure 7:
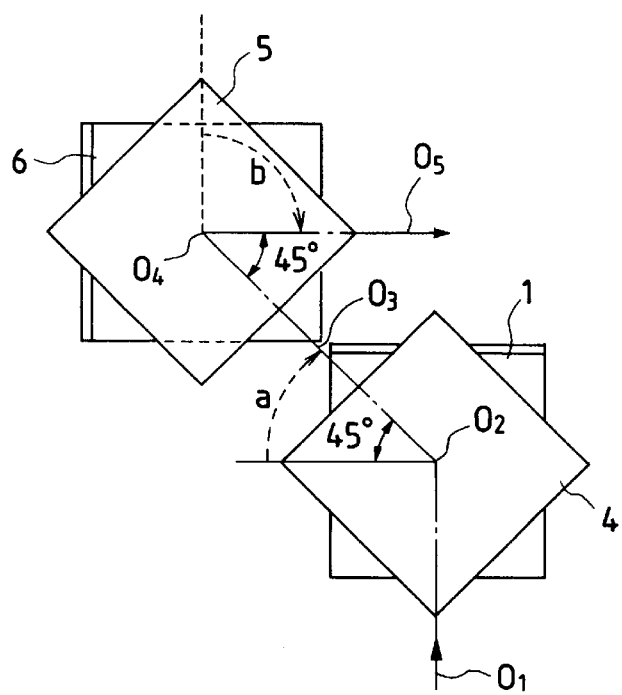
FIG. 7 shows a view of the third embodiment of the present invention taken in a direction indicated by an arrow in FIG. 6

FIG. 7 shows a view of the third embodiment which is taken in a direction indicated by an arrow in FIG. 6. A direction of a light bundle which is set upward in the condition shown in FIG. 5 can be changed into a horizontal direction by rotating the first through fourth reflecting members 45° around the axis of rotation A and rotating the fourth reflecting member 90° around the axis of rotation B as shown in FIG. 7. It is needless to say that the light bundle reflected by the fourth reflecting member can be set in any direction by changing angles of the axis of rotation A and the axis of rotation B while satisfying the relationship of a : b=1:2.

The eyepiece optical systems 15 used in the third embodiment are the same as those of the second embodiment shown in FIG. 5.

As is understood from the foregoing description, the stereoscopic microscope preferred as the third embodiment of the present invention permits continuously changing the direction of the light bundle reflected on the fourth reflecting member 6 by rotating the reflecting members around the axis of rotation A and the axis of rotation B while satisfying the relationship of a : b=1:2. As a result, the third embodiment of the present invention allows the observer to change angles for peeping through the eyepiece lens systems of the eyepiece optical systems.

The third embodiment, which has the composition similar to that of the second embodiment shown in FIG. 4 and preferred as a modification thereof, is configured so as to allow the observer to change his peeping angles (or inclination angles of the eyepiece lens systems), It is also possible to configure the first embodiment-illustrated in FIG. 2 so as to allow the observer to change angles for peeping through the eyepiece optical systems of the stereoscopic microscope. For this purpose, the second reflecting member 4 and the third reflecting member 5 are made rotatable as a whole around the optical axis $O_2$ which is used as the axis of rotation A, and the fourth reflecting member 6 is also made rotatable around the optical axis $O_4$ used as the axis of rotation B while keeping the angles of rotation a and b so as to satisfy the relationship of a : b=1:2. Further, in conjunction with the rotation of the reflecting members, the pupils 7L and 7R of the eyepiece optical systems are turned to locations 7L' and 7R' respectively which are traced in dashed lines by rotating the eyepiece optical systems 15 90° around an axis $O_5$ which is located on an extension line of the optical axis $O_1$. That is to say, the second embodiment permits the observer to change his peeping directions (or angles) in his natural postures by rotating the eyepiece optical systems so as to turn the pupils 7L and 7R of the eyepiece optical systems 90° and rotating the reflecting members while satisfying the abovementioned relationship around the axes of rotation A and B.

Furthermore, each of the second embodiment and third embodiment can be equipped, as in the case of the first embodiment illustrated in FIG. 2, with an illumination system which is composed of a light source 9, a condenser lens component 8, reflecting members 10 and 11, etc.

Moreover, though each of the embodiments described above is configured so as to shorten the distance as measured from the eye point to the object to be observed by disposing the objective lens system 2 between the first reflecting member 1 and the second reflecting member 4, the objective lens system may be disposed between the first reflecting member 1 and the object to be observed. When the objective lens system is disposed at this location, it can easily be exchanged with another. The distance as measured from the eye point to the object to be observed is not prolonged so much so far as the objective lens system is exchanged with another objective lens system having a short total length.

In addition, the vari-focal optical system 3 must comprise at least two lens units which are to be moved for changing a magnification of the stereoscopic microscope. When a reflecting member is disposed between the lens units, these lens units are apart from each other, thereby making it difficult to obtain a high vari-focal ratio. This problem can be solved by disposing the movable lens units before and after the reflecting member and integrating the lens units with the reflecting member so as to form a single lens unit which comprises the reflecting member. However, it is undesirable to dispose the first reflecting member and/or the fourth reflecting member in the vari-focal optical system since such a disposition hinders observation by displacing the object point and the eye point in conjunction with the change of the magnification. Further, when the second reflecting member and/or the third reflecting member are disposed in the variable magnification optical system, this optical system will be large and heavy in weight thereof. For this reason, it is preferable to dispose a reflecting member in a lens unit when the variable magnification optical system comprises a lens unit which is to be kept stationary during the change of the magnification.

Now, detailed description will be provided of the variable magnification focal optical system which is to be-used in the stereoscopic microscope according to the present invention. In the variable magnification focal optical system, two reflecting surfaces are fixed to a second lens unit 32, and a first lens unit 31 and a third lens unit 33 are moved for changing a magnification and focusing of the stereoscopic microscope for a purpose that the vari-focal optical system is short in a total length thereof and has a length as measured in a direction of the optical axis $O_2$ which is nearly equal to that as measured in a direction of the optical axis $O_4$. Further, the first lens unit 31 and the third lens unit 33 have positive refractive powers as defined by the above-mentioned condition, whereby a light bundle emerging from the second lens unit 32 has a small diameter. Accordingly, the variable magnification optical system makes it possible to obtain a light-weight stereoscopic microscope since it permits configuring so as to be compact the second reflecting member 4 and the third reflecting member 5 which are composed of prisms or mirrors having tendencies to increase a weight of the stereoscopic microscope. A maximum diameter of a light bundle which travels along the optical axis $O_2$ and the optical axis $O_4$ is determined dependently on the first lens unit 31 and the third lens unit 33, whereas a light bundle which passes through the second lens unit 32 has a diameter not so large. Accordingly, a distance as measured from the second reflecting member 4 to the third reflecting member 5 in the direction of the optical axis $O_3$ can be shortened within a range where the first lens unit 31 will not strike against the third lens unit 33, thereby preventing the eye point from being located far from the object point.

Examples of numerical data for the afocal variable magnification optical system are provided below:

EXAMPLE 1

$r_1$ = entrance surface
 $d_1 = D_1$ (variable)
$r_2 = -4.652311$
 $d_2 = 0.0245725$    $n_1 = 1.816$    $\nu_1 = 46.6$
$r_3 = -0.576651$
 $d_3 = 0.0020833$
$r_4 = 0.2327148$
 $d_4 = 0.0447313$    $n_2 = 1.72916$   $\nu_2 = 54.7$
$r_5 = 2.1363732$
 $d_5 = 0.0208333$    $n_3 = 1.84666$   $\nu_3 = 23.8$
$r_6 = 0.3998642$
 $d_6 = D_2$ (variable)
$r_7 = -0.277245$
 $d_7 = 0.0104166$    $n_4 = 1.816$    $\nu_4 = 46.6$
$r_8 = 0.0976381$
 $d_8 = 0.0177492$
$r_9 = \infty$
 $d_9 = 0.4166666$    $n_5 = 1.79952$   $\nu_5 = 42.2$
$r_{10} = \infty$
 $d_{10} = 0.0310086$
$r_{11} = -0.117758$
 $d_{11} = 0.0125$     $n_6 = 1.6727$    $\nu_6 = 32.1$
$r_{12} = -0.114610$
 $d_{12} = D_3$
$r_{13} = 2.9463112$
 $d_{13} = 0.0166666$   $n_7 = 1.726$    $\nu_7 = 53.5$
$r_{14} = 0.3866137$
 $d_{14} = 0.0257859$   $n_8 = 1.497$    $\nu_8 = 81.6$
$r_{15} = -0.306833$
 $d_{15} = D_4$ (variable)
$r_{16}$ = exit surface

| magnification | 0.233× | 0.466× | 0.933× |
|---|---|---|---|
| $D_1$ | 0.1462802 | 0.0487575 | 0 |
| $D_2$ | 0.025 | 0.1225228 | 0.1712802 |
| $D_3$ | 0.2057053 | 0.1454683 | 0.025 |
| $D_4$ | 0 | 0.060237 | 0.1807053 |

$\beta = 0.233\times \sim 0.933\times$
AD = 0.0458, A = 0.05, AP = 0, $f_{OC}$ = 0.7,
IH = 0.025, HH = 0.1228, $f_1$ = 0.37695, $f_2$ = −0.1085,
$f_3$ = 0.78063, $f_{20}$ = −0.08739, $f_{21}$ = −2.4542

EXAMPLE 2

$r_1$ = entrance surface
 $d_1 = D_1$ (variable)
$r_2 = 0.3276198$
 $d_2 = 0.0518114$    $n_1 = 1.48749$   $\nu_1$ 70.2
$r_3 = -1.325918$
 $d_3 = 0.0020833$
$r_4 = 0.1886252$
 $d_4 = 0.0597693$    $n_2 = 1.48749$   $\nu_2 = 70.2$
$r_5 = 1.2281153$
 $d_5 = 0.0208333$    $n_3 = 1.84666$   $\nu_3 = 23.8$
$r_6 = 0.4929500$
 $d_6 = D_2$ (variable)
$r_7 = 6.0661219$
 $d_7 = 0.0104166$    $n_4 = 1.72916$   $\nu_4 = 54.7$
$r_8 = 0.0887555$
 $d_8 = 0.0265080$
$r_9 = -0.110686$
 $d_9 = 0.0125$     $n_5 = 1.72916$   $\nu_5 = 54.7$
$r_{10} = \infty$
 $d_{10} = 0.4166666$   $n_6 = 1.51633$   $\nu_6 = 64.1$
$r_{11} = \infty$
 $d_{11} = 0.0138975$   $n_7 = 1.48749$   $\nu_7 = 70.2$
$r_{12} = -0.540701$
 $d_{12} = D_3$ (variable)
$r_{13} = 2.3268724$
 $d_{13} = 0.0166666$   $n_8 = 1.52944$   $\nu_8 = 51.7$
$r_{14} = 0.3370325$
 $d_{14} = 0.024471$    $n_9 = 1.497$    $\nu_9 = 81.6$
$r_{15} = -0.491383$
 $d_{15} = D_4$
$r_{16}$ = exit surface

| magnification | 0.233× | 0.466× | 0.933× |
|---|---|---|---|
| $D_1$ | 0.0917445 | 0.0305801 | 0 |
| $D_2$ | 0.025 | 0.0861645 | 0.1167446 |
| $D_3$ | 0.2366314 | 0.1660853 | 0.025 |
| $D_4$ | 0 | 0.0705461 | 0.2116315 |

$\beta = 0.233\times \sim 0.933\times$
AD = 0.0458, A = 0.05, AP = 0, $f_{OC}$ = 0.7,
IH = 0.025, $f_1$ = 0.30991, $f_2$ = −0.09289,
$f_3$ = 0.87854, $f_{20}$ = −0.12362, $f_{21}$ = −0.25281

EXAMPLE 3 r1 = entrance surface
 $d_1 = D_1$ (variable)
$r_2 = 0.6809665$
 $d_2 = 0.0426548$    $n_1 = 1.497$    $\nu_1 = 81.6$
$r_3 = -0.882233$
 $d_3 = 0.0021388$
$r_4 = 0.3389510$
 $d_4 = 0.0391005$    $n_2 = 1.497$    $\nu_2 = 81.6$
$r_5 = 3.2549111$
 $d_5 = 0.0213885$    $n_3 = 1.84666$   $\nu_3 = 23.8$
$r_6 = 1.4762306$
 $d_6 = D_2$ (variable)
$r_7 = -0.345746$
 $d_7 = 0.0106942$    $n_4 = 1.72916$   $\nu_4 = 54.7$
$r_8 = \infty$
 $d_8 = 0.1711083$    $n_5 = 1.79952$   $\nu_5 = 42.2$
$r_9 = \infty$
 $d_9 = 0.0174379$    $n_6 = 1.72916$   $\nu_6 = 54.7$
$r_{10} = 0.0756823$
 $d_{10} = 0.0253391$
$r_{11} = -0.061868$
 $d_{11} = 0.0161268$   $n_7 = 1.51633$   $\nu_7 = 64.1$
$r_{12} = \infty$
 $d_{12} = 0.1711083$   $n_8 = 1.79952$   $\nu_8 = 42.2$
$r_{13} = \infty$
 $d_{13} = 0.0338747$   $n_9 = 1.497$    $\nu_9 = 81.6$
$r_{14} = -0.1348.99$
 $d_{14} = D_3$ (variable)
$r_{15} = 0.9874227$
 $d_{15} = 0.0171108$   $n_{10} = 1.51633$  $\nu_{10} = 64.1$
$r_{16} = 0.2575234$
 $d_{16} = 0.0264841$   $n_{11} = 1.497$   $\nu_{11} = 81.6$
$r_{17} = -0.741712$
 $d_{17} = D_4$ (variable)
$r_{18}$ = exit surface

| magnification | 0.233× | 0.466× | 0.933× |
|---|---|---|---|
| $D_1$ | 0.1577962 | 0.0526249 | 0 |
| $D_2$ | 0.0256662 | 0.1308376 | 0.1834625 |
| $D_3$ | 0.2219699 | 0.1565487 | 0.0256662 |
| $D_4$ | 0 | 0.0654311 | 0.1963036 |

$\beta = 0.233\times \sim 0.933\times$
AD = 0.047, A = 0.051, AP = 0, $f_{OC}$ = 0.718,
IH = 0.026, $f_1$ = 0.43293, $f_2$ = −0.11738,
$f_3$ = 0.90164, $f_{20}$ = −0.0714, $f_{21}$ = −1.39856

The numerical data listed above are normalized to a maximum length of the afocal variable magnification optical system. In the numerical data, the reference symbols $r_1$, $r_2$, . . . represent radii of curvature on surfaces of respective lens elements, the reference symbols $d_1$, $d_2$, . . . designate thicknesses of the respective lens elements and airspaces reserved therebetween, the reference symbols $n_1$, $n_2$, . . . denote refractive indices of the respective lens elements, and the reference symbols $\nu_1$, $\nu_2$, . . . represent Abbe's numbers of the respective lens elements. Further, the reference symbol AD designate an eccentricity of each of the right and left eyepiece optical systems as measured from the optical axis of the variable magnification optical system, the reference symbol A denotes a diameter of an aperture stop of the eyepiece optical system, the reference symbol AP represents a distance as measured along the optical axis from the aperture stop of the eyepiece optical system to a final surface of the afocal variable magnification optical system, the reference symbol IH designates a maximum image height as measured from the optical axis of the eyepiece optical system,. the reference symbol HH denotes a distance as measured between principal points of the second lens unit, the reference symbols f1, f2, fe represent focal lengths of the first, second, third lens unit respectively of the variable magnification optical system, the reference symbol foc represents a focal length of the imaging lens unit of the eyepiece optical system, and the reference symbols $f_{20}$ and $f_{21}$ represent focal lengths of the lens components which are disposed on the object side and the image side respectively in the second lens unit.

When the reflecting members are disposed in the optical system illustrated in FIG. 2, for example, the airspaces are widened and the lens units have weakened refractive powers, whereby the optical system must be prolonged in the direction of the optical axis $O_2$ for keeping the magnification thereof unchanged. When the optical system is prolonged in the direction of the optical axis $O_2$, it has a longer protrusion and is unbalanced, thereby making it difficult to sustain a microscope body so that it will not be inclined. In order to avoid this drawback, the lens components required for composing the second lens unit are disposed before and after the reflecting member. Regarding the lens components and the reflecting member as a single lens unit, the distance between the principal points is prolonged so that the reflecting member is equivalent to a thin reflecting member. Such a configuration makes it possible to design the afocal variable magnification optical system compact and facilitate correction of aberrations in the optical system.

Figure 8A:
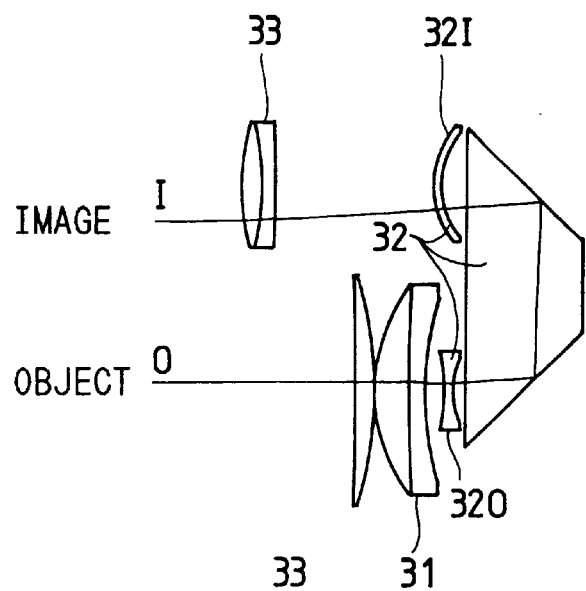
FIGS. 8A ,8B, 8C,9A, 9B, 9C, 10A, 10B and 10C show sectional views illustrating Example 1 through Example 3 of the variable magnification optical system to be used in the stereoscopic microscope according to the present invention.
Figure 8B:
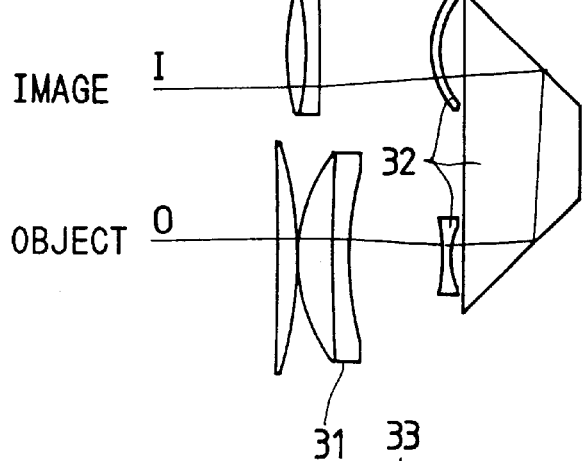
Figure 8C:
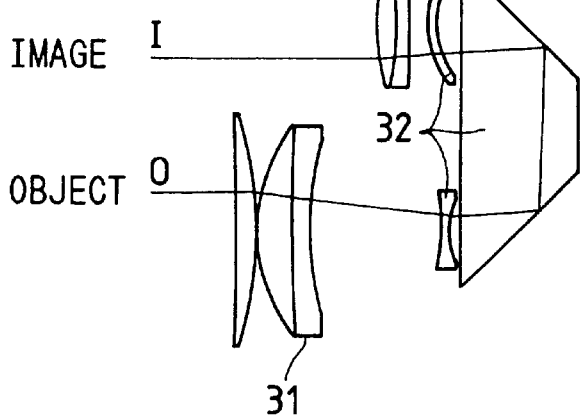

An afocal variable magnification optical system having the numerical data perferred as the Example 1 is illustrated in FIG. 8A, FIG. 8B and FIG. 8C, wherein the afocal variable magnification optical system is set to obtain magnifications of 0.233×, 0.466× and 0.933× of the stereoscopic microscope according to the present invention. In these drawings, the reference symbol O represents the object side and the reference symbol I designates the image side.

In the afocal variable magnification optical system having the numerical data preferred as the Example 1, an airspace reserved between the object side lens component 32O and the image side lens component 32I has an optical path length of 0.2795, whereas the distance as measured between the principal points is 0.1228 which is shortened 43%. It cannot be said that the afocal variable magnification optical system is sufficiently compact unless it has a shortened ratio of 35% or higher and the first embodiment of the present invention illustrated in FIG. 2 is configured sufficiently compact as is judged from the shortened ratio described above. Further, it is desirable for displacing the principal points that the lens component 32I disposed on the image side in the second lens unit is a meniscus lens component having a concave surface on the object side and has a focal length of at least 1 in absolute, or nearly no refractive power. In a case where a wide airspace is reserved between the two lens components of the second lens unit as in the afocal variable magnification optical system having the numerical data of the Example 1, it is difficult to correct curvature of field. Aberration characteristics of the stereoscopic microscope which uses the afocal variable magnification optical system set for the magnifications of 0.233×, 0.466× and 0.933× are illustrated in FIGS. 11A–11C, FIGS. 12A–12C and FIGS. 13A–13C respectively.

Figure 9A:
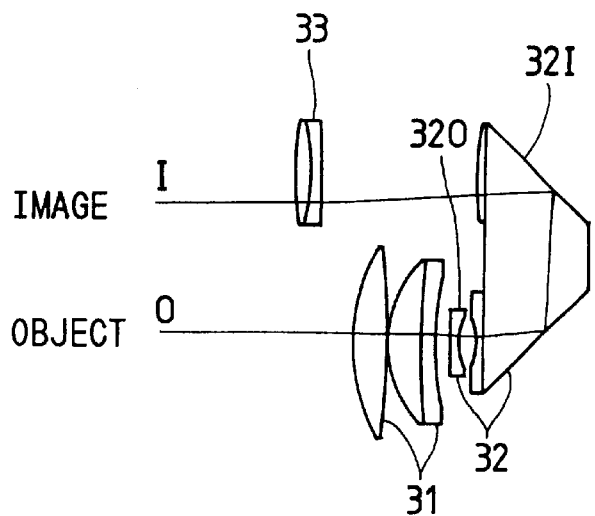
Figure 9B:
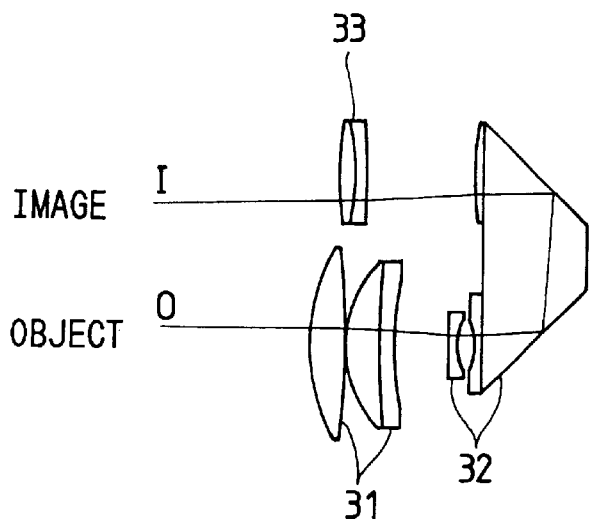
Figure 9C:
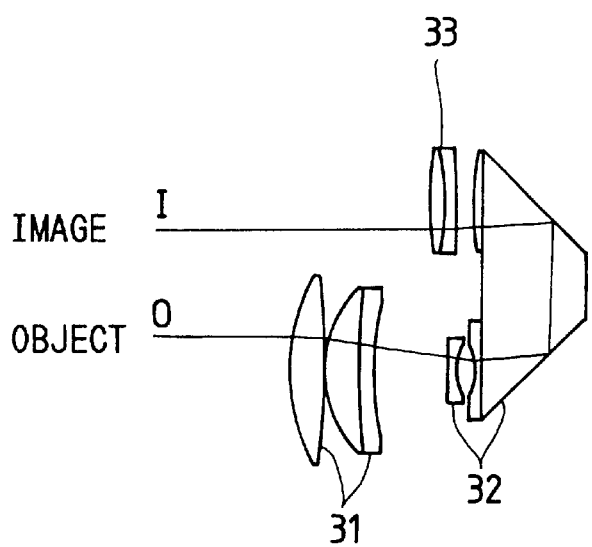

An afocal variable magnification optical system having the numerical data preferred as the Example 2 has a configuration illustrated in FIG. 9A, FIG. 9B and FIG. 9C, wherein a second lens unit of the afocal variable magnification optical system is composed of an object side negative lens component 32O, and an image side thick lens component 32I which consists of lens elements cemented to a front surface and a rear surface of a prism. Since the prism is configured as a long lens component as described above, the airspace reserved between these two lens components is narrow. In contrast to the afocal variable magnification optical system having the numerical data of Example 1 which uses the image side lens component 32I of the second lens unit configured as the meniscus lens component having nearly no refractive power, the afocal variable magnification optical system having the numerical data of the Example 2 adopts two reflecting surfaces disposed in the lens unit so as to widen the airspace and strengthen the negative refractive power, thereby reducing curvature of field. When the afocal variable magnification optical system having the numerical data of the Example 2 is set for obtaining magnifications of 0.233×, 0.466× and 0.933×, the stereoscopic microscope according to the present invention has aberration characteristics illustrated in FIGS. 14A–14C, FIGS. 15A–15C and FIGS. 16A–16C respectively.

Figure 10A:
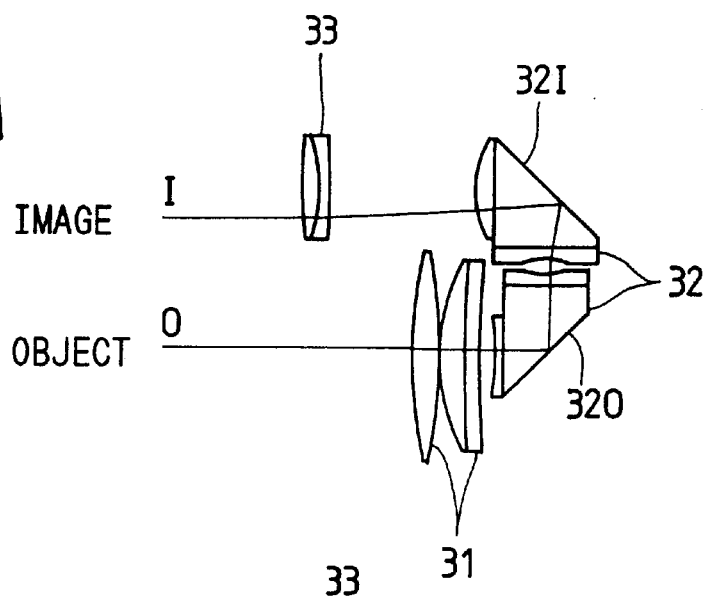
Figure 10B:
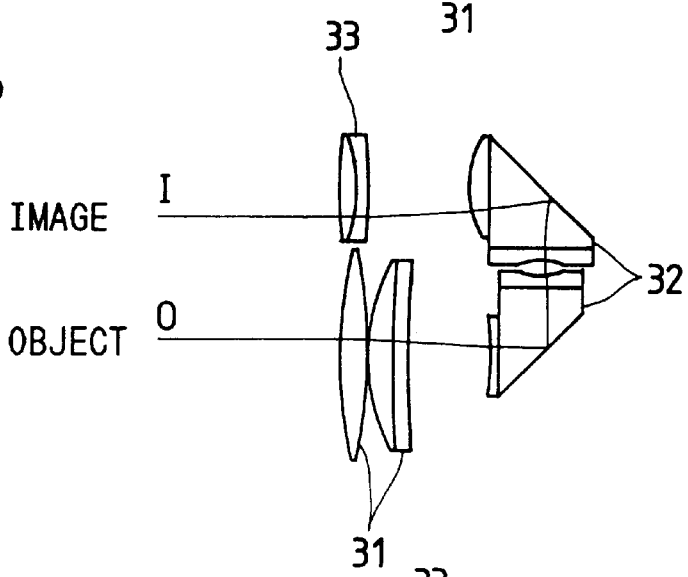
Figure 10C:
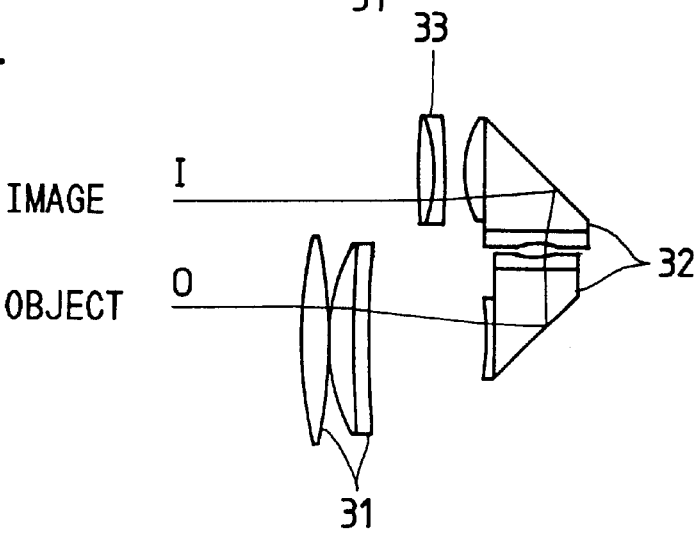
Figure 11A:
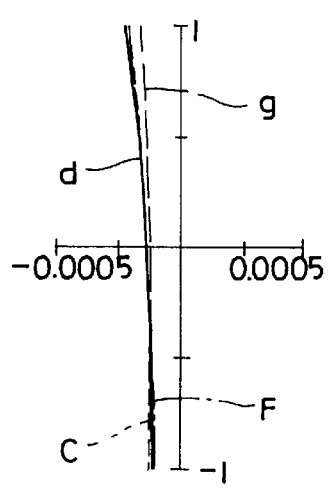
FIGS. 11A–11C shows graphs illustrating aberration characteristics of the Example 1 at a magnification level of 0.233× thereof.
Figure 11B:
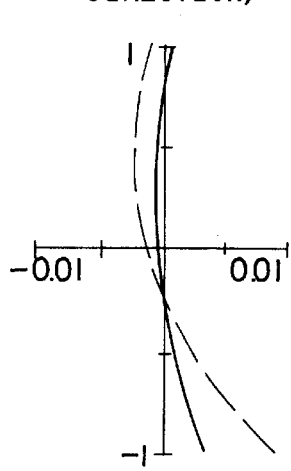
Figure 11C:
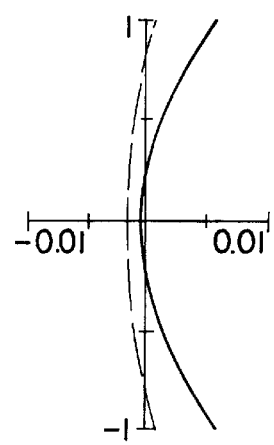
Figure 12A:
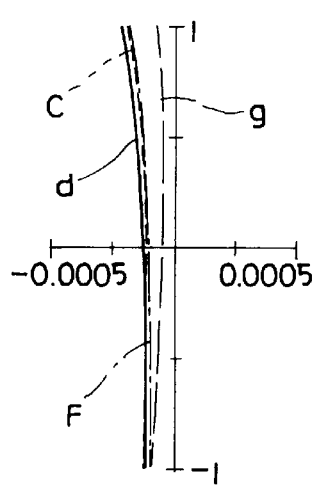
FIGS. 12A–12C graphs illustrating aberration characteristics of the Example 1 at a magnification level of 0.466× thereof.
Figure 12B:
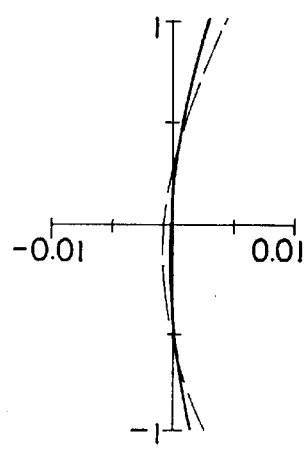
Figure 12C:
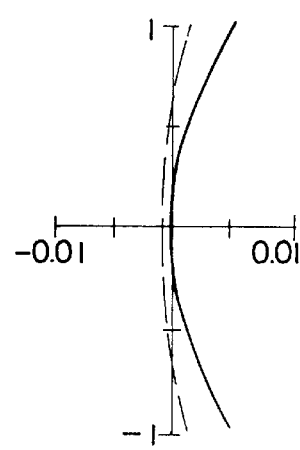
Figure 13A:
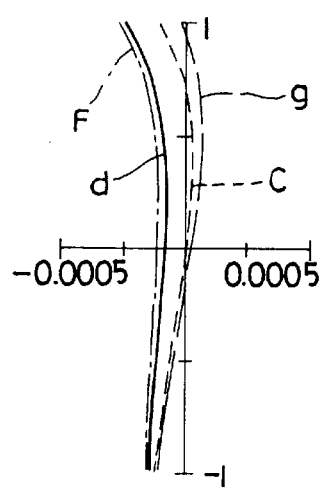
FIGS. 13A–13C shows graphs illustrating aberration characteristics of the Example 1 at a magnification level of 0.933× thereof.
Figure 13B:
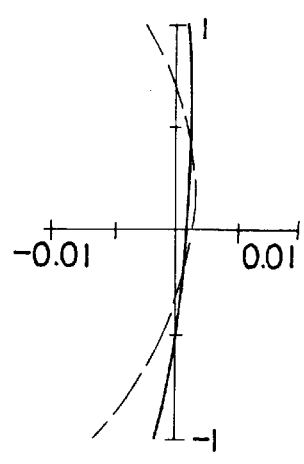
Figure 13C:
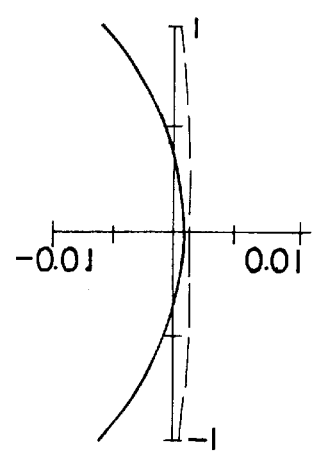
Figure 14A:
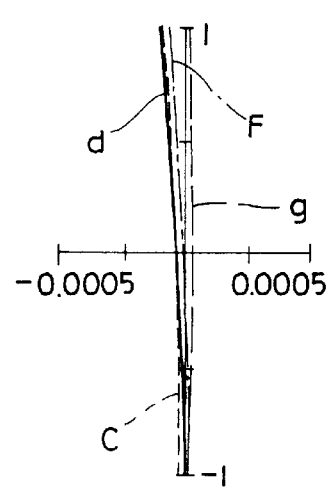
FIGS. 14A–14C shows curves illustrating aberration characteristics of the Example 2 at a magnification level of 0.233× thereof.
Figure 14B:
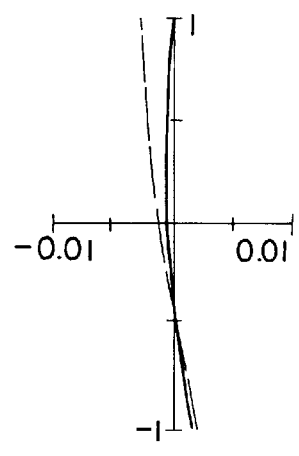
Figure 14C:
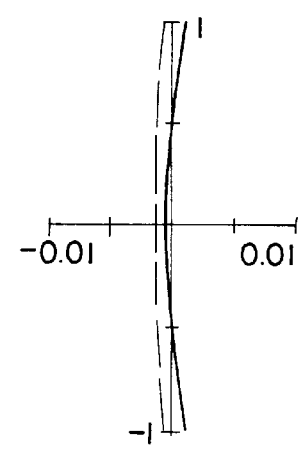
Figure 15A:
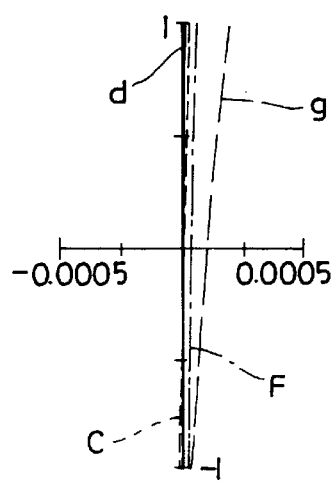
FIGS. 15A–15C shows curves illustrating aberration characteristics of the Example 2 at a magnification level of 0.466× thereof.
Figure 15B:
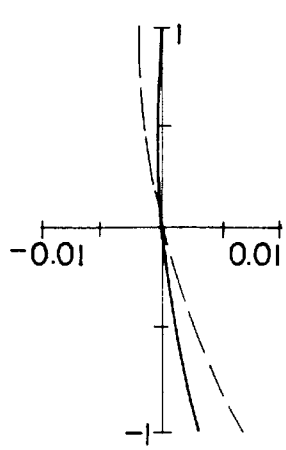
Figure 15C:
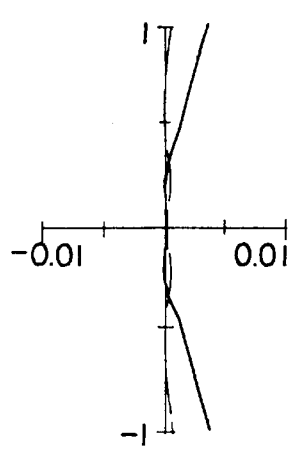
Figure 16A:
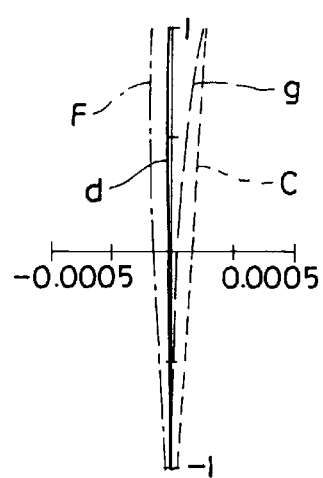
FIGS. 16A–16C shows curves illustrating aberration characteristics of the Example 2 at a magnification level of 0.933× thereof.
Figure 16B:
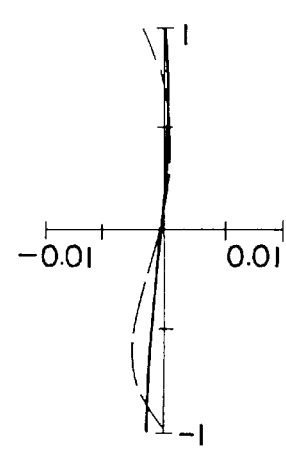
Figure 16C:
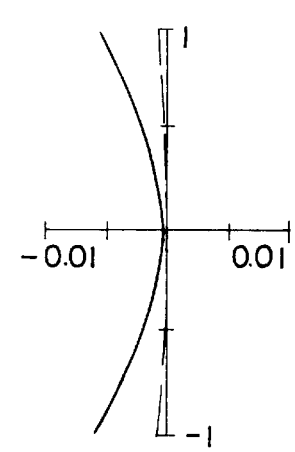
Figure 17A:
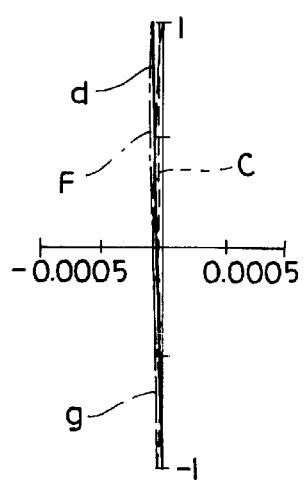
FIGS. 17A–17C shows graphs visualizing aberration characteristics of the Example 3 at a magnification level of 0.233× thereof.
Figure 17B:
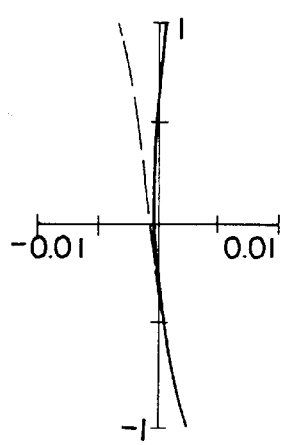
Figure 17C:
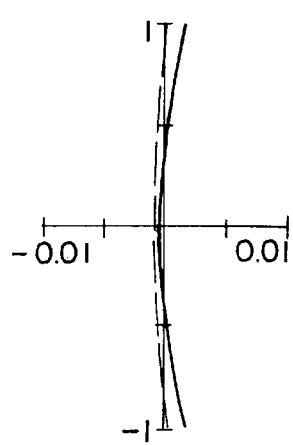
Figure 18A:
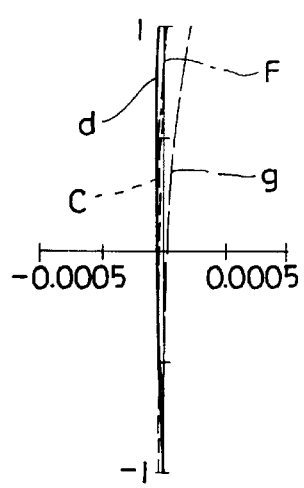
FIGS. 18A–18C shows graphs visualizing aberration characteristics of the Example 3 at a magnification level of 0.466× thereof.
Figure 18B:
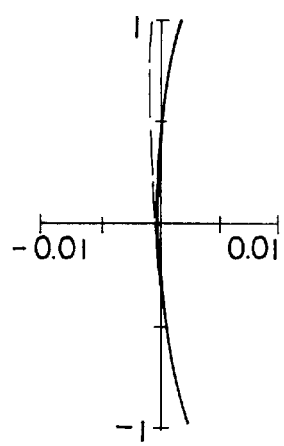
Figure 18C:
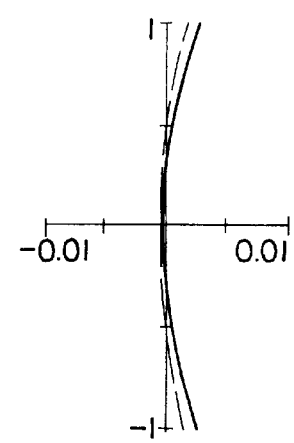
Figure 19A:
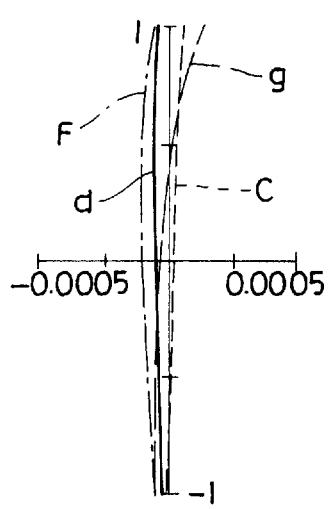
FIGS. 19A–19C shows graphs visualizing aberration characteristics of the Example 3 at a magnification level of 0.933× thereof.
Figure 19B:
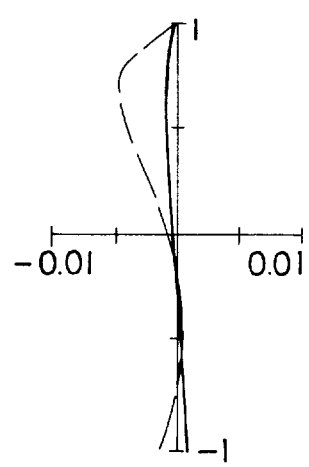
Figure 19C:
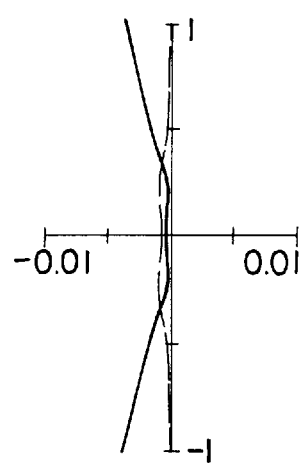

An afocal variable magnification optical system having the numerical data preferred as the Example 3 has a configuration illustrated in FIG. 10A, FIG. 10B and FIG. 10C, wherein two lens components 32O and 32I have reflecting surfaces separately. The afocal variable magnification optical system having the numerical data of the Example 3 exhibits the effect which is similar to that obtained by the afocal variable magnification optical system having the numerical data of the Example 2. In the afocal vari-focal optical system having the numerical data of the Example 3, positive lens components disposed in the first lens unit and the second lens unit are made of a extraordinarily dispersing glass material for favorably correcting offaxial chromatic aberration and axial chromatic aberration. When the afocal variable magnification optical system having the Numerical data of the Example 3 is set for obtaining magnifications of 0.233×, 0.466× and 0.933×, the stereoscopic microscope according to the present invention has aberration characteristics visualized in FIGS. 17A–17C, FIGS. 18A–18C and FIGS. 19A–19C respectively.

The graphs of the aberration characteristics of the afocal variable magnification optical systems having the numerical data described above visualize an axial aberration and astigmatism in conditions where a center line of the optical axes of the right and left eyepiece optical system is coincided with the optical axis of the afocal variable magnification optical system. On the graphs visualizing the axial aberration, lateral aberration is traced in values as measured on a plane including the right and left optical axes and the ordinate corresponds to aperture ratios. The curves of astigmatism visualize astigmatism in two types: one which is measured on a plane including the right and left optical axes of the eyepiece optical systems and the other as measured in a direction perpendicular to the plane mentioned above. "Horizontal direction" or "Vertical direction" is specified in each of the graphs visualizing astigmatism. These aberrations are traced in values as measured on image surfaces of the eyepiece optical systems each of which uses an imaging lens component having a focal length of $f_{OC}$ Astigmatism is represented as a vertical aberration, a point at which light intensity is a minimum on a plane connecting an optical axis to an image point is indicated by a dashed line and an image point which is optimum in a direction perpendicular to the plane is indicated by a solid line.

Each of the embodiments of the stereoscopic microscope according to the present invention which have been described above uses a pair of right and left eyepiece lens systems. However, the stereoscopic microscope according to the present invention can adopt an eyepiece lens system consisting of a single lens system which has a diameter large enough to cover two light bundles to be incident on the right and left eyes of the observer in place of the two eyepiece lens systems. Accordingly, the term "eyepiece lens systems" used in the foregoing description may be interpreted as "right and left eyepiece lens systems" or "a single eyepiece lens system having a diameter large enough to cover two light bundles to be incident on two eyes". Further, no inconvenience is constituted when a single eyepiece lens system having such a large diameter is adopted in each of the embodiments illustrated in the accompanying drawings.

The stereoscopic microscope according to the present invention is compact, has favorable optical performance and permits lowering an eye point.

I claim:

1. A stereomicroscope comprising:
    an objective lens system; and
    a variable magnification optical system,
    wherein each of said objective lens system and said variable magnification optical system has a single optical axis, and the optical axes of said objective lens system and said variable magnification optical system are coincident,
    wherein a plurality of reflecting members common to left and right light bundles are disposed on said single optical axis so that light bundles passing through portions apart from said single optical axis pass through left and right pupils and are incident on a pair of imaging lenses corresponding to the left and right pupils,
    wherein a common optical system having said coincident single optical axis and including said objective lens system and said variable magnification optical system and said plurality of reflecting members is one of an erecting optical system and not an erecting optical system, and
    wherein an optical system which exchanges the left and right light bundles with each other is disposed after the pair of imaging lenses when said common optical system is an erecting optical system, and wherein erecting optical systems which erect each of left and right images are disposed after the pair of imaging lenses respectively when said common optical system is not an erecting optical system.

2. A stereomicroscope according to claim 1, wherein a reflecting member is disposed between an entrance pupil of said variable magnification optical system and said two pupils for bending an optical path in said variable magnification optical system.

3. A stereomicroscope according to claim 2 or 1, wherein an eyepiece lens is disposed on a rear side of each of said pupils.

4. A stereomicroscope according to claim 2 or 1, wherein said variable magnification optical system has a plurality of lens units and wherein a lens unit which is disposed at a most front side of said favorable magnification optical system and a lens unit which is disposed at a most rear side of said variable magnification optical system each have a positive refractive power.

5. A stereomicroscope according to claim 2 or 1, further comprising an illuminating device;
    wherein said illuminating device comprises an illumination light source, and a lens arranged separately from said objective lens system to lead a light from said light source onto an object; and
    wherein a light led from said light source is illuminated onto said object without passing though said objective lens system.

6. A stereomicroscope according to claim 5 further comprising a beam splitter,
    wherein an optical path going from said object to said objective lens system and an optical path going from said illuminating device to said object are superimposed together by said beam splitter.

7. A stereomicroscope according to claim 6, wherein said optical axis of said objective lens system and an optical axis of said illuminating device are substantially coincident between said beam splitter and said object.

8. A stereomicroscope according to claim 7, wherein said illuminating device is located on a transmission optical path of said beam splitter; and wherein said objective lens system is arranged on a reflection optical path of said beam splitter.

9. A stereomicroscope according to claim 6, wherein said illuminating device is located on a transmission optical path of said beam splitter; and wherein said objective lens system is arranged on a reflection optical path of said beam splitter.

10. A stereomicroscope according to claim 1, wherein an optical system to erect an image of said object is provided in an optical path led to said left and right pupils.

11. A stereomicroscope comprising:
    a single objective lens system and a single variable magnification optical system;
    four reflecting members; and
    a fifth reflecting member;
    wherein each of said objective lens system and said variable magnification optical system has a single optical axis, and the optical axes of said objective lens system and said variable magnification optical system are coincident;
    wherein left and right pupils are set at rear side portions of said variable magnification optical system for conducting a three dimensional observation;
    wherein rays coming from an object and passing through portions apart from optical axes of said objective lens system and said variable magnification optical system pass over said left and right pupils;
    wherein the four reflecting members are constructed and arranged to change a direction of an optical path and to erect said image and are used in common with each of said left and right pupils; and
    wherein the fifth reflecting member is constructed and arranged to exchange light bundles after said light bundles pass through said left and right pupils.

12. A stereomicroscope as in claim 11, wherein:
    two of said four reflecting members are disposed within said variable magnification system;
    another of said four reflecting members is disposed on an object side of said objective lens system; and
    another of said four reflecting members is disposed on an image side of said variable magnification system.

* * * * *